United States Patent
Yokoyama

(10) Patent No.: US 10,049,114 B2
(45) Date of Patent: Aug. 14, 2018

(54) ELECTRONIC DEVICE, METHOD AND STORAGE MEDIUM

(71) Applicant: Kabushiki Kaisha Toshiba, Minato-ku, Tokyo (JP)

(72) Inventor: Sachie Yokoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 14/936,504

(22) Filed: Nov. 9, 2015

(65) Prior Publication Data
US 2016/0275095 A1    Sep. 22, 2016

Related U.S. Application Data

(60) Provisional application No. 62/134,913, filed on Mar. 18, 2015.

(51) Int. Cl.
| | | |
|---|---|---|
| G06F 3/048 | (2013.01) | |
| G06F 17/30 | (2006.01) | |
| G06F 3/0488 | (2013.01) | |
| G06F 3/0482 | (2013.01) | |
| G06F 3/0481 | (2013.01) | |
| G06F 3/0484 | (2013.01) | |

(52) U.S. Cl.
CPC ...... *G06F 17/30126* (2013.01); *G06F 3/0482* (2013.01); *G06F 3/04817* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 7,929,770 B2 | 4/2011 | Arai | |
| 2007/0098263 A1* | 5/2007 | Furukawa | G06F 3/03545 382/181 |
| 2007/0274590 A1 | 11/2007 | Arai | |
| 2008/0250012 A1* | 10/2008 | Hinckley | G06F 17/30864 |
| 2013/0315483 A1 | 11/2013 | Shibata et al. | |
| 2015/0370473 A1* | 12/2015 | Chen | G06F 1/1626 345/174 |

FOREIGN PATENT DOCUMENTS

| | | |
|---|---|---|
| JP | 2007-317022 A | 12/2007 |
| JP | 2013-246732 A | 12/2013 |
| JP | 2014-086053 A | 5/2014 |

* cited by examiner

*Primary Examiner* — Thanh Vu
(74) *Attorney, Agent, or Firm* — Knobbe, Martens, Olson & Bear, LLP

(57) ABSTRACT

According to one embodiment, an electronic device includes a processor and a display controller. The processor acquires one or more first related data associated with a first content, when displaying a file containing the first content. The display controller displays the file containing the first content and the one or more first related data. The processor acquires one or more second related data associated with a second content, when a content of the file is updated from the first content to the second content. The display controller updates the display to display a file containing the second content and the one or more second related data based on the update of the content of the file from the first content to the second content.

18 Claims, 9 Drawing Sheets

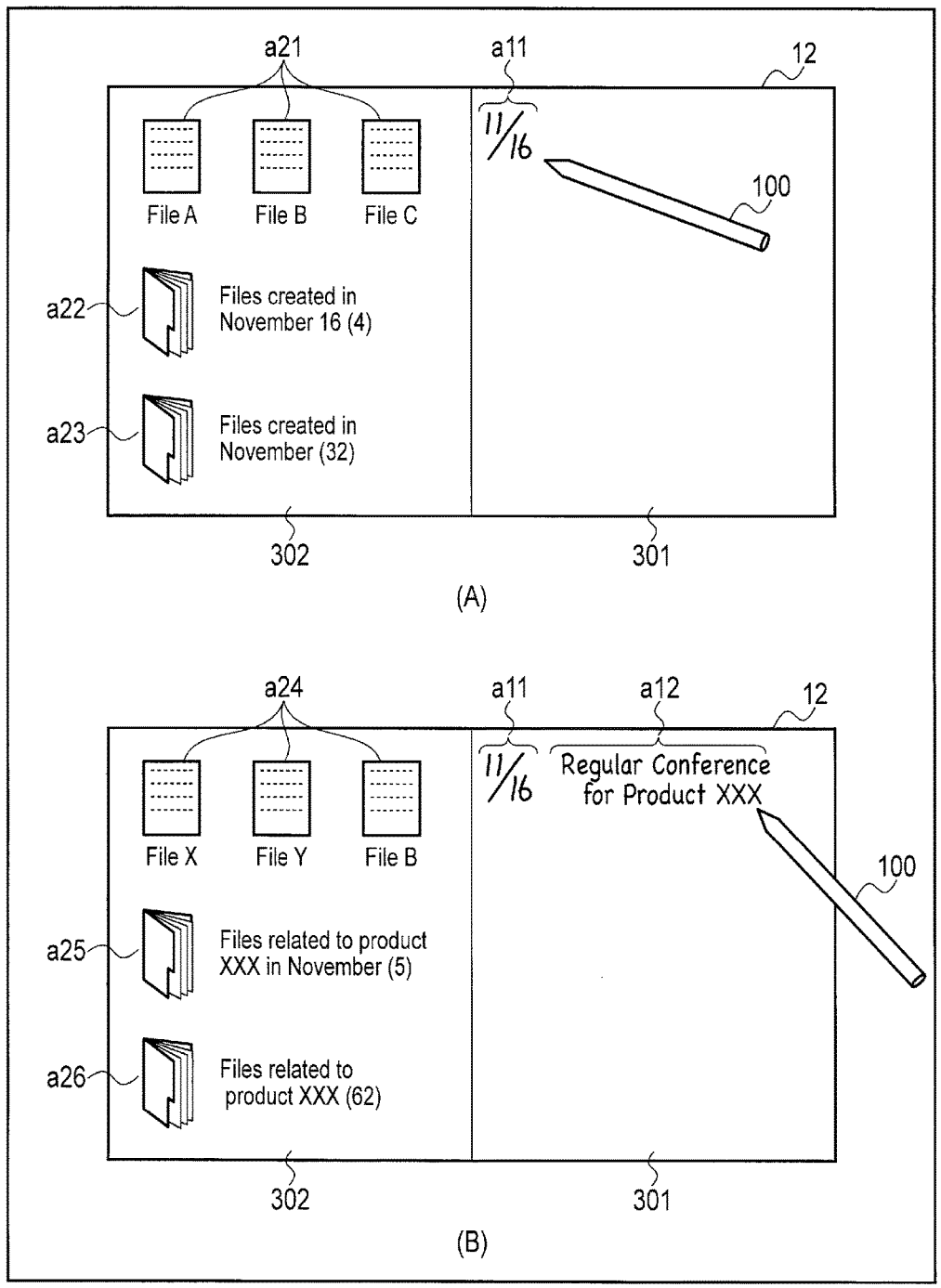
F I G. 4

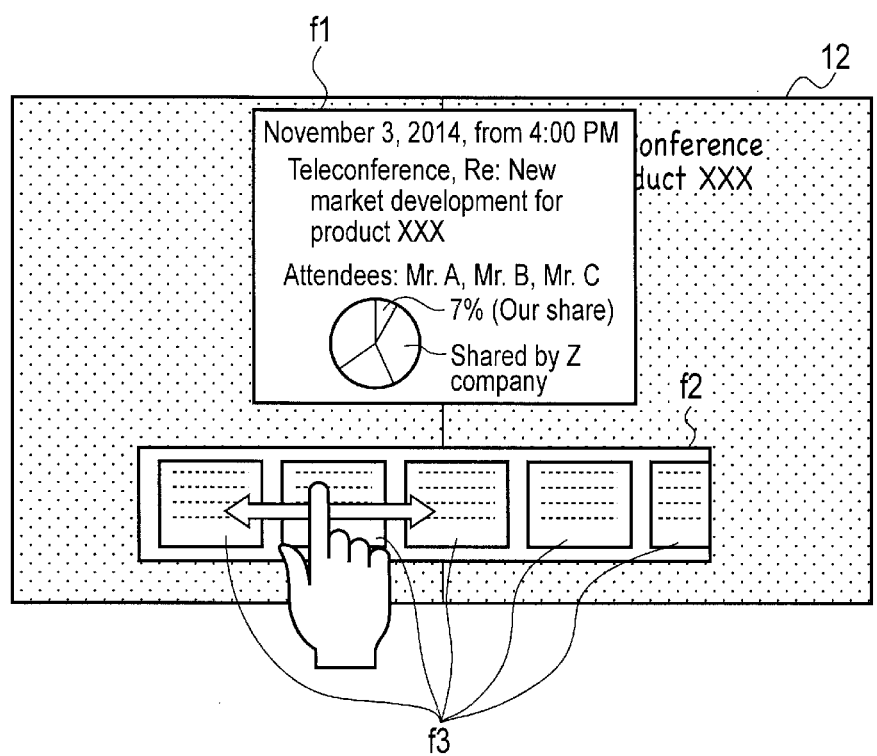
F I G. 6

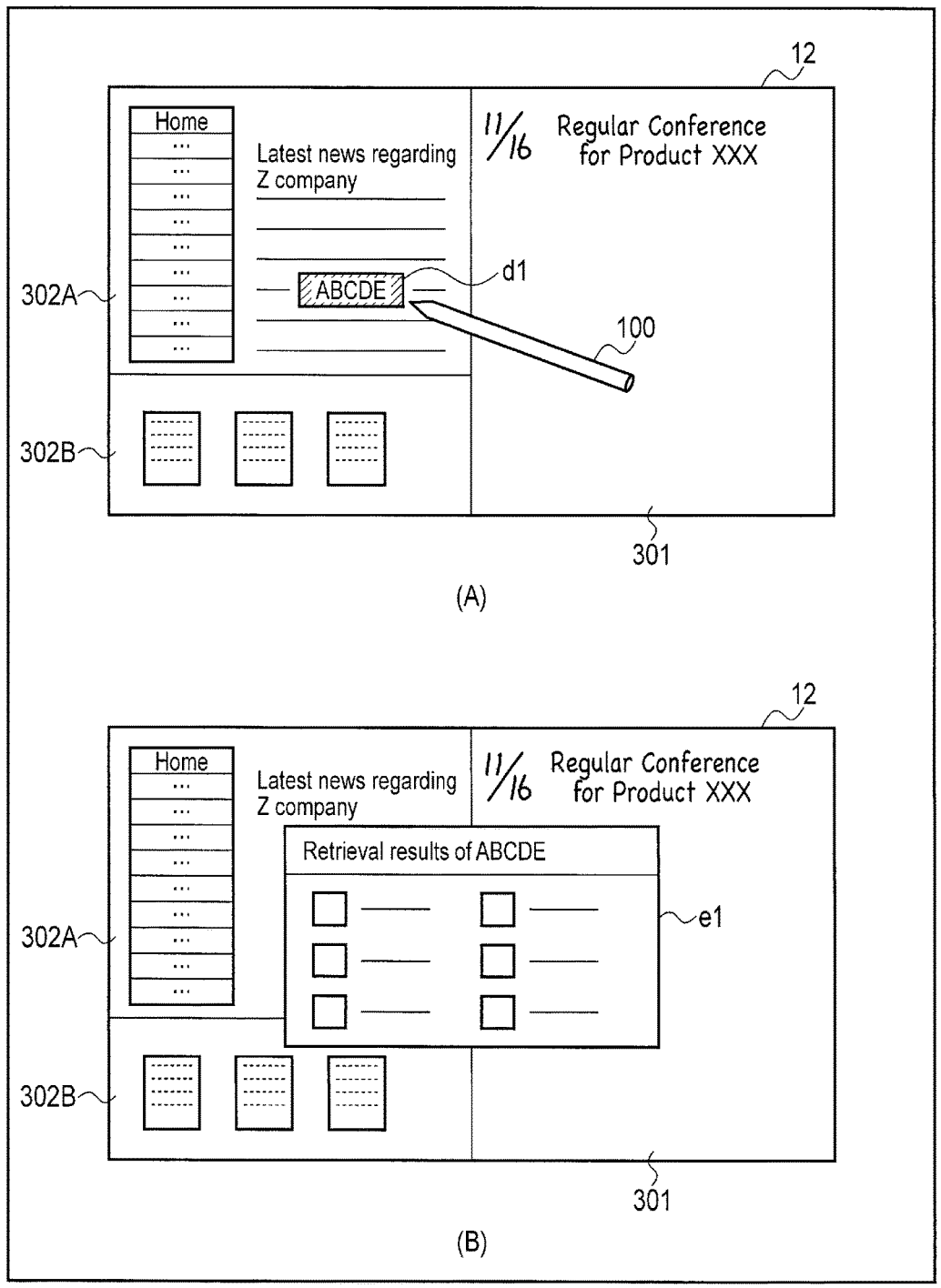
F I G. 7

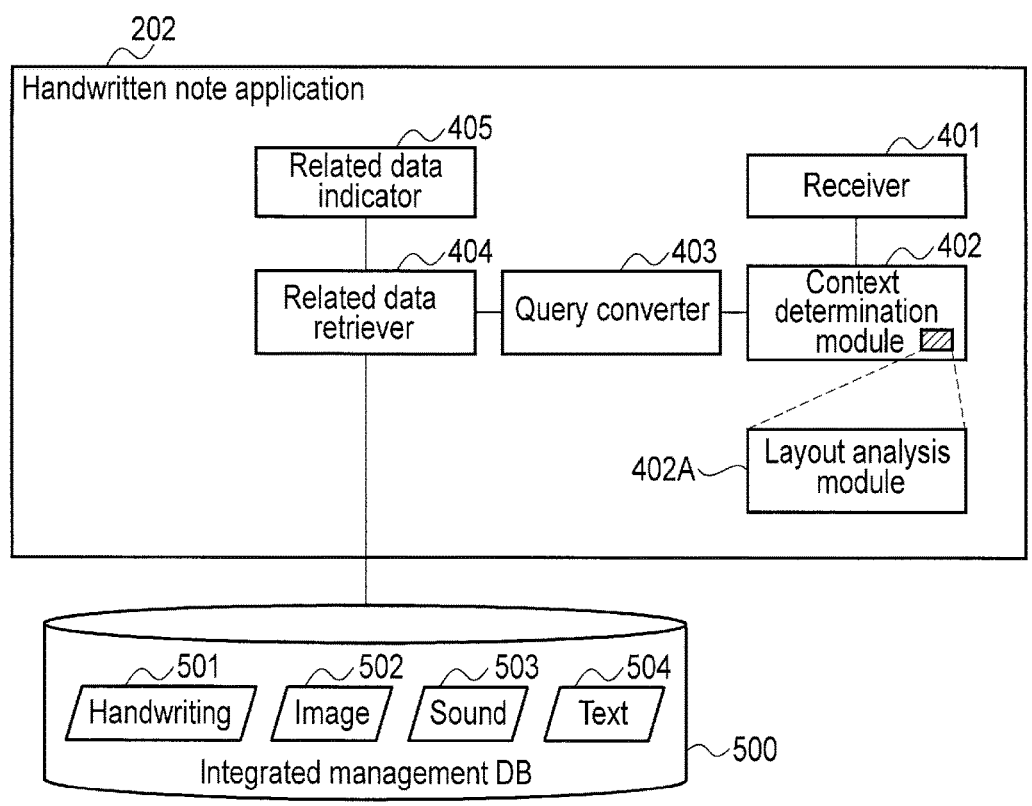
F I G. 8

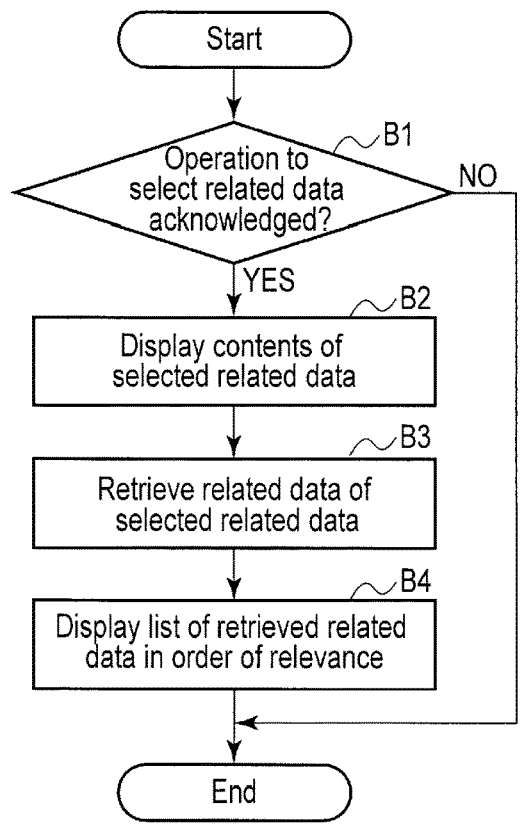
F I G. 10
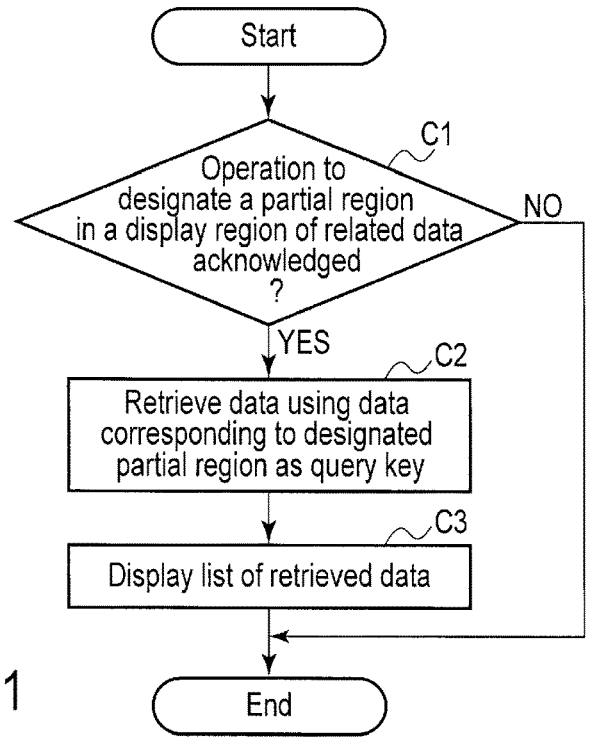
F I G. 11

ELECTRONIC DEVICE, METHOD AND STORAGE MEDIUM

CROSS-REFERENCE TO RELATED APPLICATIONS

This application claims the benefit of U.S. Provisional Application No. 62/134,913, filed Mar. 18, 2015, the entire contents of which are incorporated herein by reference.

FIELD

Embodiments described herein relate generally to an electronic device, method, and storage medium.

BACKGROUND

In recent years, battery-driven mobile electronic devices such as tablet computers and smartphones have become used widely. In many cases, such electronic devices include a touchscreen display which accepts a touch on a screen as an input operation. Such electronic devices sometimes have a handwriting input function which can produce a handwritten document including characters, figures, and the like handwritten on the screen of the touchscreen display.

In general, when a document is prepared, referential materials are searched and referred to frequently. Hereinafter, the description of the electronic device having a handwriting input function to produce a handwritten document is presented in consideration of this point. Furthermore, the description is presented given that referential materials are stored as electronic files in a storage medium inside the electronic device or in an external device which is accessible by the electronic device.

In such a case, before accessing a target file, a user is often forced to carry out burdensome operations such as checking files scattered in a plurality of hierarchical layers retrospectively and repeating retrievals of files changing retrieval conditions such as keywords and the like. That is, in many cases, a user cannot find a desired target file smoothly.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary first illustration for explaining an outline of a related data indication function of the electronic device of the embodiment.

FIG. 6 is an exemplary third illustration for explaining the outline of the related data indication function of the electronic device of the embodiment.

FIG. 7 is an exemplary fourth illustration for explaining the outline of the related data indication function of the electronic device of the embodiment.

FIG. 8 is an exemplary block diagram showing the related data indication function of the electronic device of the embodiment.

FIG. 10 is an exemplary flowchart showing a second operation of the related data indication function of the electronic device of the embodiment.

FIG. 11 is an exemplary flowchart showing a third operation of the related data indication function of the electronic device of the embodiment.

DETAILED DESCRIPTION

Various embodiments will be described hereinafter with reference to the accompanying drawings.

In general, according to one embodiment, an electronic device includes a processor and a display controller. The processor is configured to acquire one or more first related data associated with a first content, when displaying a file containing the first content. The display controller is configured to display the file containing the first content and the one or more first related data. The processor is configured to acquire one or more second related data associated with a second content, when a content of the file is updated from the first content to the second content. The display controller is configured to update the display to display a file containing the second content and the one or more second related data based on the update of the content of the file from the first content to the second content.

Figure 1:
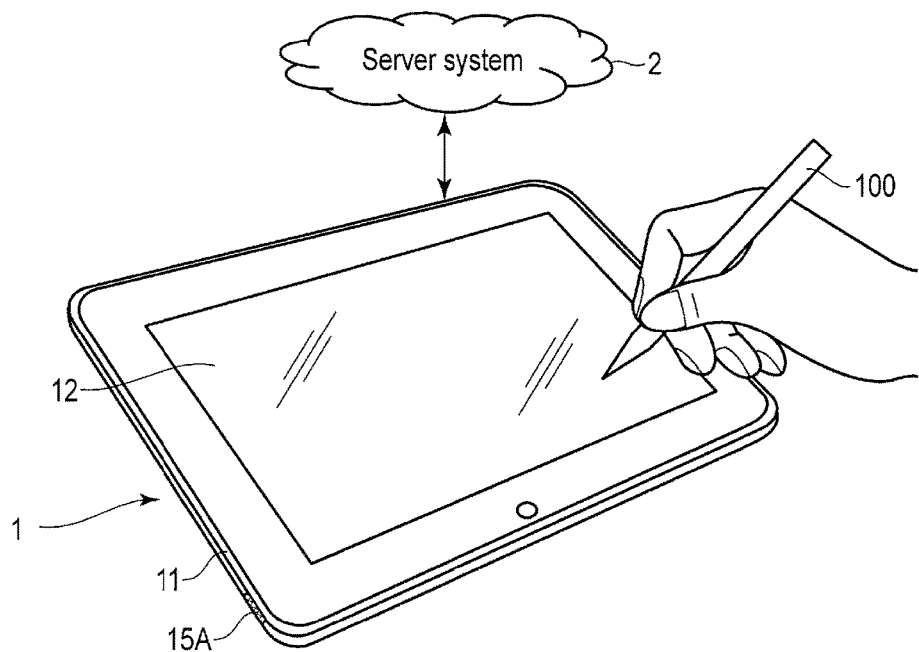
FIG. 1 is an exemplary illustration showing an example of an exterior of an electronic device of an embodiment.

FIG. 1 is an exemplary illustration showing an example of an exterior of an electronic device of an embodiment. The electronic device is a mobile electronic device which can accept a handwriting input operation made by a pen (stylus) or a finger. The electronic device does not store a handwritten document as bitmap image data but as stroke data of one or more strokes indicative of a time series of coordinates of sampling points in loci of the strokes drawing a character, number, mark, and figure which is a component of the document, and the electronic device retrieves a handwritten document based on the stroke data. That is, the electronic device recognizes a correspondence between the stroke data and symbols (bitmap images and handwriting). Since the electronic device can generate a bitmap image from the stroke data based on this correspondence, the electronic device can associate the stroke data with a part of a document image (character candidate region) input from a scanner, a camera, or the like. Therefore, the electronic device can take in a document written on a paper in past as stroke data.

Furthermore, the electronic device can perform a character recognition process with respect to a bitmap image represented by partial stroke data (partial data corresponding to a single symbol region), store a handwritten document as a text composed of character codes, and retrieve the handwritten document based on the text. That is, the electronic device recognizes a correspondence between the stroke data of one or more strokes and character codes. Since the electronic device can generate a bitmap image from a partial stroke data corresponding to each character code based on this correspondence, the electronic device can acquire character codes of a partial document image (character candidate region) input from a scanner, a camera, or the like. Consequently, the electronic device can take in a document written on a paper in past as a digital text.

The electronic device may be realized as a tablet computer, notebook computer, smartphone, and the like. Hereinafter, the electronic device is realized as a tablet computer 1. The tablet computer 1 includes a main body 11 and a touchscreen display 12 which can accept a handwriting input of a document. The touchscreen display 12 is attached to the front surface of the main body 11 in alignment therewith. The display can accept various operations input by the pen 100 or a finger touching the screen of the touchscreen display 12. A camera 13 is provided with the rear surface of the main body 11 to take in an image of a document. The camera 13 can take in not only images of documents printed/handwritten on a paper but also images of documents printed/handwritten on various analogue media including a three-dimensional substance. Furthermore, a microphone 14 is provided with the upper surface of the main body 11 and speakers 15A and 15B are provided with both side surfaces of the main body 11, respectively.

The main body 11 has a thin box-shaped casing. In the touchscreen display 12, a flatpanel display and a sensor configured to detect a touch position of the pen 100 or the finger on the screen of the flatpanel display are incorporated. The flatpanel display may be a liquid crystal display (LCD), for example. The sensor may be a capacitance touch panel or an electromagnetic induction digitizer, for example. Hereinafter, the description is presented given that both the digitizer and the touch panel are incorporated in the touchscreen display 12.

Each of the digitizer and the touch panel is disposed to cover the screen of the flatpanel display. The touchscreen display 12 can detect touch operations not only those are made on the screen by a finger but also those are made on the screen by the pen 100. The pen 100 may be an electromagnetic induction pen, for example. A user can perform a handwriting input operation on the touchscreen display 12 using an external object (pen 100 or finger). During the handwriting input operation, loci of the movement of the external object on the screen, that is, loci of the strokes handwritten by the handwriting input operation are depicted in real time, and thus the locus of each stroke is displayed on the screen. One stroke corresponds to a locus of the movement of the external object while it is touching the screen. Characters, numbers, marks, and figures which are a collection of the handwritten strokes are gathered to constitute a handwritten document.

A handwritten document is stored in a storage medium as time series data indicative of a series of coordinates of the locus of each stroke and an order relationship between the strokes. The time series data indicate handwriting order of a plurality of strokes and include a plurality of stroke data corresponding to the strokes. In other words, the time series data indicate a collection of stroke data of the time series corresponding to a plurality of strokes, respectively. Each stroke data corresponds to one stroke and includes a coordinate data series (time series coordinate) corresponding to each point on the locus of this stroke. The arrangement order of these stroke data is the handwriting order of each stroke, that is, the stroke order.

Figure 2:
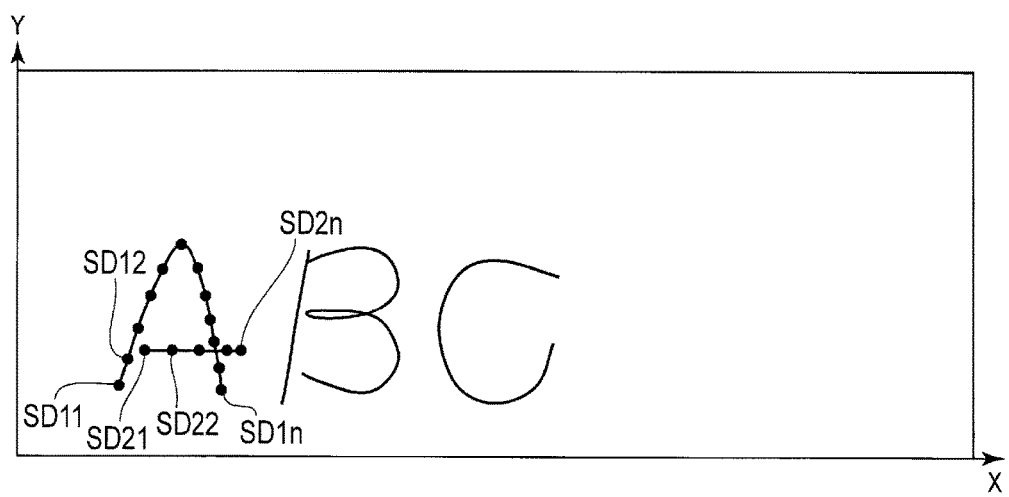
FIG. 2 is an exemplary illustration showing an example of a handwritten document handwritten on a screen of a touchscreen display.

FIG. 2 shows an example of a handwritten document (handwritten character string) handwritten on a screen of the touchscreen display 12 with the pen 100 or the like. Here, the handwritten character string "A B C" is written on the screen in the order of A, B, and C.

The handwritten character "A" is composed of two strokes (a stroke drawing a shape like "∧" and a stroke drawing a shape like "-") handwritten with the pen 100 or the like, that is, it is represented by two loci. The locus of the pen drawing the "∧" shape handwritten first is sampled in real time at regular intervals, for example, and the time series coordinates $SD11, SD12, \ldots, SD1n$ of the stroke drawing the "∧" shape are obtained. Similarly, the locus of the pen drawing the "-" shape handwritten next is sampled in real time at regular intervals, and the time series coordinates $SD21, SD22, \ldots, SD2n$ of the stroke drawing the "-" shape are obtained.

Note that the handwritten character "B" is composed of two strokes handwritten with the pen 100 or the like, that is, it is represented by two loci. Furthermore, the handwritten character "C" is composed of one stroke handwritten with the pen 100 or the like, that is, it is represented by a single locus.

Furthermore, the tablet computer 1 can read optional preexistent time series data from the storage medium and display a handwritten document corresponding to the time series data, that is, loci corresponding to respective strokes indicated by the time series data, on the screen.

In the present embodiment, the time series data (handwritten document) are manageable as a single page or a plurality of pages. To manage the data, the time series data may be divided into area units each of which has a size displayable in a single screen and a collection of these area units of the time series data may be recorded as a single page. Otherwise, the size of page may be made changeable. If the size of page is changeable, it can expand to be larger than the single screen size, and thus, a handwritten document which has an area larger than the screen size can be handled as a single page. If the entirety of the page cannot be displayed at once, the page may be displayed in a reduced size to fit the screen or the page may be scrolled to show a display target part.

The tablet computer 1 has a network communication function and can be linked to a server system 2 on the network such as internet. That is, the tablet computer 1 can execute communication with the server system 2 on the network. The server system 2 is a system to share various information items and provides online storage service and the like.

The server system 2 includes a mass storage medium such as a hard disk drive (HDD). The tablet computer 1 can transmit the time series data to the server system 2 via the network and store the time series data in the storage medium of the server system (upload). To establish secured communication between the tablet computer 1 and the server system 2, the server system 2 may authenticate the tablet computer 1 at the initial phase of communication. In the authentication, a dialog box may be displayed on the screen of the tablet computer 1 to prompt a user to input an ID or a password, or an ID of the tablet computer 1 may be automatically transmitted from the tablet computer 1 to the server system 2.

Therefore, even if the capacity of the storage medium in the tablet computer 1 is short, the tablet computer 1 can handle a large number of time series data or a great capacity of time series data.

Furthermore, the tablet computer 1 can read one or more optional time series data from the storage medium of the server system 2 (download) and display each locus of strokes indicated by the read time series data on the screen of the touchscreen display 12 of the tablet computer 1. To display the loci, a list of thumbnails (thumbnail images) obtained by reducing each page of the plurality of time series data may be displayed on the screen of the touchscreen display 12, or one page selected from the thumbnails may be displayed on the screen of the touchscreen display 12 in a normal size.

As can be understood from the above, in the present embodiment, the storage medium to store the time series data may be either the one in the tablet computer 1 or the one in the server system 2. With the tablet computer 1, a user can store optional time series data in either the storage medium in the tablet computer 1 or the storage medium in the server system 2, selected optionally.

Furthermore, the server system 2 may store not only the time series data but also various information items such as images, sounds, texts, and the like. The tablet computer 1 stores/acquires these various information items in/from the server system 2.

Figure 3:
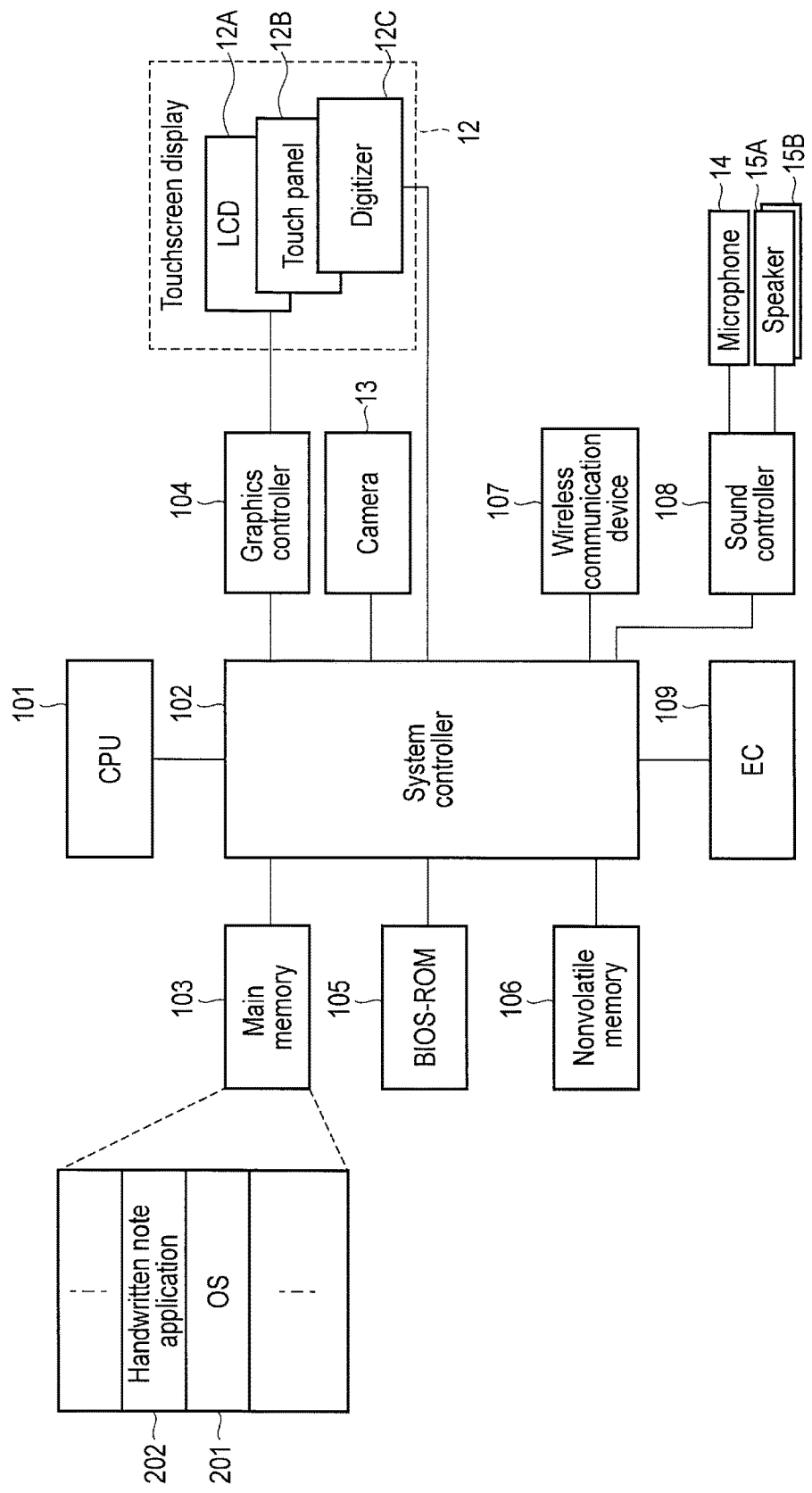
FIG. 3 an exemplary illustration showing an example of a system structure of the electronic device of the embodiment.

FIG. 3 is an exemplary illustration showing an example of a system structure of the tablet computer 1.

As shown in FIG. 3, the tablet computer 1 includes, in addition to the above mentioned touchscreen display 12, camera 13, microphone 14, speakers 15A and 15B, a CPU 101, system controller 102, main memory 103, graphics controller 104, BIOS-ROM 105, nonvolatile memory 106, wireless communication device 107, sound controller 108, and embedded controller (EC) 109, for example.

The CPU 101 is a processor which controls the operation of various components in the tablet computer 1. The CPU 101 executes various software programs loaded in the main memory 103 from the nonvolatile memory 106 which is a storage device. The software programs include an operating system (OS) 201 and various application programs. The application programs include a handwritten note application program 202. The handwritten note application program 202 has a function to prepare and display the time series data. The handwritten note application program 202 further has functions such as an edit function of the time series data, retrieval function based on a handwritten, character recognition function, document input function, and related data indication function. The document input function is a function to input a document image taken in by a scanner or camera 13 as time series data or texts. The related data indication function is described later.

Furthermore, the CPU 101 executes the BIOS stored in the BIOS-ROM 105. The BIOS is a program used to control hardware.

The system controller 102 is a device to connect between a local bus of the CPU 101 and the various components. The system controller 102 includes a memory controller used for access control of the main memory 103. Furthermore, the system controller 102 has a function to execute communication with the graphics controller 104 via a serial bus of PCI EXPRESS standard.

The graphics controller 104 is a display controller to control an LCD 12A used as a display monitor of the tablet computer 1. The LCD 12A displays a screen image based on display signals generated by the graphics controller 104. On the LCD 12A, a touch panel 12B and a digitizer 12C are disposed. The touch panel 12B is a capacitance pointing device used for an input operation on the screen of the LCD 12A. A contact point of a finger on the screen, a movement of the contact point, and the like are detected by the touch panel 12B. The digitizer 12C is an electromagnetic induction pointing device used for an input operation on the screen of the LCD 12A. A contact point of the pen 100 on the screen, a movement of the contact point, and the like are detected by the digitizer 12C.

The wireless communication device 107 is a device configured to execute wireless communication such as wireless LAN communication or 3G mobile communication.

The sound controller 108 is a sound device having circuits such as a D/A converter to convert digital signals to electric signals and an amplifier to amplify the electric signals to output sound data of a resume target to the speakers 15A and 15B. The sound controller 108 has circuits such as an A/D converter to convert electric signals to digital signals to input sound data by the microphone 14.

The EC 109 is a single-chip microcomputer including a controller for power management. The EC 109 has a function to turn on/off the power of the tablet computer 1 based on a power button operation by a user.

Now, the outline of the related data indication function of the tablet computer 1 (handwritten note application program 202) with the above described components is explained with reference to FIG. 4, FIG. 5, FIG. 6 and FIG. 7.

FIG. 4 shows an example of a handwriting input operation in progress in which the pen 100 is used on the touchscreen display 12 while the related data indication function of the handwritten note application program 202 is activated (in on-state). When the related data indication function is on, the handwritten note application program 202 sets two regions 301 and 302 on the screen of the touchscreen display 12 as shown in FIG. 4. Each partition inside a display screen (window) of the program is referred to as pane, for example. Hereinafter, the region 301 is right pane 301, and the region 302 is left pane 302.

The right pane 301 is a region in which a user performs handwriting of a handwritten document. The handwritten note application program 202 acquires stroke data corresponding to a stroke handwritten inside the right pane 301. On the other hand, the left pane 302 is a region in which related data (related file) of the handwritten document handwritten in the right pane 301 are indicated to the user. The handwritten note application program 202 performs file retrieval based on the acquired stroke data and indicates a retrieved file as a related file. As mentioned above, the handwritten note application program 202 has the character recognition function, and thus, can perform file retrieval using a character code corresponding to the acquired stroke data as a retrieval key.

In the example depicted, a scene that a user with the tablet computer 1 attends a business conference and makes a record of the conference is given. FIG. 4 (A) shows an example of the screen of the touchscreen display 12 right after the user finishes writing a date of "11/16" represented by symbol a11 with the pen 100. Furthermore, FIG. 4 (B) shows an example of the screen of the touchscreen display 12 right after the user finishes writing a title of "Regular Conference for Product XXX" represented by symbol a12 with the pen 100.

As shown in FIG. 4 (A), when a character string (date) of "11/16" (a11) is handwritten, stroke data corresponding to each of the strokes are acquired by the handwritten note application program 202. The handwritten note application program 202 analyzes the acquired stroke data and recognizes that the stroke data represent the character string of "11/16" and further recognizes that the stroke data represent a date. Note that semantic and linguistic analysis of the character string can be performed based on various known methods. That is, at this moment, the handwritten note application program 202 acquires at least a keyword "November 16".

When the handwritten note application program 202 acquires the keyword "November 16", the program first retrieves files containing data "November 16" in their content, for example. A file containing such data in its content is, for example, a file containing a handwritten document including stroke data corresponding to "November 16" and "16th of Nov.", or a file containing a text including a character code corresponding to "November 16" and "16th of Nov." Furthermore, such a file may contain sound data including a speech period in which a phrase "November 16" is voiced, or may contain an image including a character string of "November 16" or "16th of Nov." As mentioned above, the tablet computer 1 of the present embodiment stores a handwritten document as a text composed of character codes. Using the same technique, a result of sound recognition or a result of image recognition can be stored as a text, and the sound or the image can be a target of retrieval. Furthermore, as mentioned above, the tablet computer 1 can cooperate with the server system 2, and thus, files stored in the server system 2 can be a target of retrieval as well.

The handwritten note application program 202 sorts the retrieved files in an ascending order of relevance and indicates a predetermined number of files in icon forms at, for example, the upper row of the left pane 302. The relevance can be calculated in various methods. The icons represented by symbol a21 are examples of icons representing files of indication target. If handwritten documents and image data are indicated, icons used for such items may be thumbnails. The user can display the content of the files by performing a touch operation on the icons a21.

The handwritten note application program 202 second retrieves files containing the data "November 16" as their attribution, for example. A file containing such data as its attribution is, for example, a file of which date of creation or date of update is "November 16". The handwritten note application program 202 indicates an icon representing a folder storing the retrieved files at, for example, the middle row of the left pane 302. The icon represented by symbol a22 is an example of an icon representing the folder storing the retrieved files. The user can display a list of the retrieved files, or more specifically, a list of icons (or thumbnails) representing the files of indication target by performing a touch operation onto the icon a22. Then, the user performs a touch operation onto an icon displayed as above to display the content of the icon touched.

The handwritten note application program 202 thirdly retrieves files containing the data "November" as their attribution, for example. A file containing such data as attribution is, for example, a file of which date of creation or date of update is "November". The handwritten note application program 202 indicates an icon representing a folder storing the retrieved files at, for example, the lower row of the left pane 302. The icon represented by symbol a23 is an example of an icon representing the folder storing the retrieved files. The user can display a list of the retrieved files, or more specifically, a list of icons (or thumbnails) representing the files of indication target by performing a touch operation onto the icon a23. Then, the user performs a touch operation onto an icon displayed as above to display the content of the icon touched.

Then, as shown in FIG. 4 (B), when the character string (title) of "Regular Conference for Product XXX" is handwritten, stroke data corresponding to each of the strokes are acquired by the handwritten note application program 202. The handwritten note application program 202 analyzes the acquired stroke data and recognizes that the stroke data represent the character string of "Regular Conference for Product XXX" and extracts keywords such as "Product XXX" and "Regular Conference". Note that the extraction of the character string can be performed based on various known methods. That is, at this moment, the handwritten note application program 202 acquires keywords such as "Product XXX" and "Regular Conference" in addition to the keyword "November 16".

When the handwritten note application program 202 acquires the keywords "Product XXX" and "Regular Conference" in addition to the keyword "November 16", the program first retrieves files containing at least one of data "November 16", "Product XXX", and "Regular Conference" in their content, for example. The handwritten note application program 202 sorts the retrieved files in an ascending order of relevance and indicates a predetermined number of files in icon forms at, for example, the upper row of the left pane 302. The icons represented by symbol a24 are examples of icons representing files of indication target. That is, the icons (files) indicated at, for example, the upper row of the left pane 302 are updated to adapt the progress of the handwriting operation in the right pane 301. More specifically, when various stroke data are stored and keywords increase, more relevant files are retrieved.

The handwritten note application program 202 second retrieves files containing the data "Product XXX" as their content and the data "November" as their attribution, for example. The handwritten note application program 202 indicates an icon representing a folder storing the retrieved files at, for example, the middle row of the left pane 302. The icon represented by symbol a25 is an example of an icon representing the folder storing the retrieved files. The user can display a list of the retrieved files, or more specifically, a list of icons (or thumbnails) representing the files of indication target by performing a touch operation onto the icon a25. Then, the user performs a touch operation onto an icon displayed as above to display the content of the icon touched.

The handwritten note application program 202 third retrieves files containing the data "Product XXX" as their content, for example. The handwritten note application program 202 indicates an icon representing a folder storing the retrieved files at, for example, the lower row of the left pane 302. The icon represented by symbol a26 is an example of an icon representing the folder storing the retrieved files. The user can display a list of the retrieved files, or more specifically, a list of icons (or thumbnails) representing the files of indication target by performing a touch operation onto the icon a26. Then, the user performs a touch operation onto an icon displayed as above to display the content of the icon touched.

That is, the content of the folders represented by the icons indicated at, for example, the middle row and the lower row of the left pane 302 is also updated to adapt the progress of the handwriting operation in the right pane 301. More specifically, when various stroke data are stored and keywords increase, a group of files can be more suitable and precise. To make the group more suitable and precise in accordance with the increase of keywords, various algorithms can be used.

As can be understood from the above, the tablet computer 1 of the present embodiment can retrieve and indicate files related to a handwritten document currently being created by using the handwritten document itself as a retrieval keyword while the user is not bothered by related file retrieval operations such as checking files scattered in a plurality of hierarchical layers retrospectively and repeating retrievals of files changing retrieval conditions such as keywords and the like.

Furthermore, the tablet computer 1 of the present embodiment can retrieve and indicate more relevant files with the progress of handwritten document creation, and thus, the user operation can be supported efficiently.

Note that, in FIG. 4, the related files are indicated in the left pane 302 to be divided to the upper, middle, and lower rows; however, this is only an example of indication format. Any other indication formats which are updatable to adapt the progress of the handwriting operation in the right pane 301 can be used. Furthermore, timing to retrieve related files for updating indication targets is optional and it may be, for example, when a handwriting operation in the right pane 301 stops for a certain period.

Figure 5:
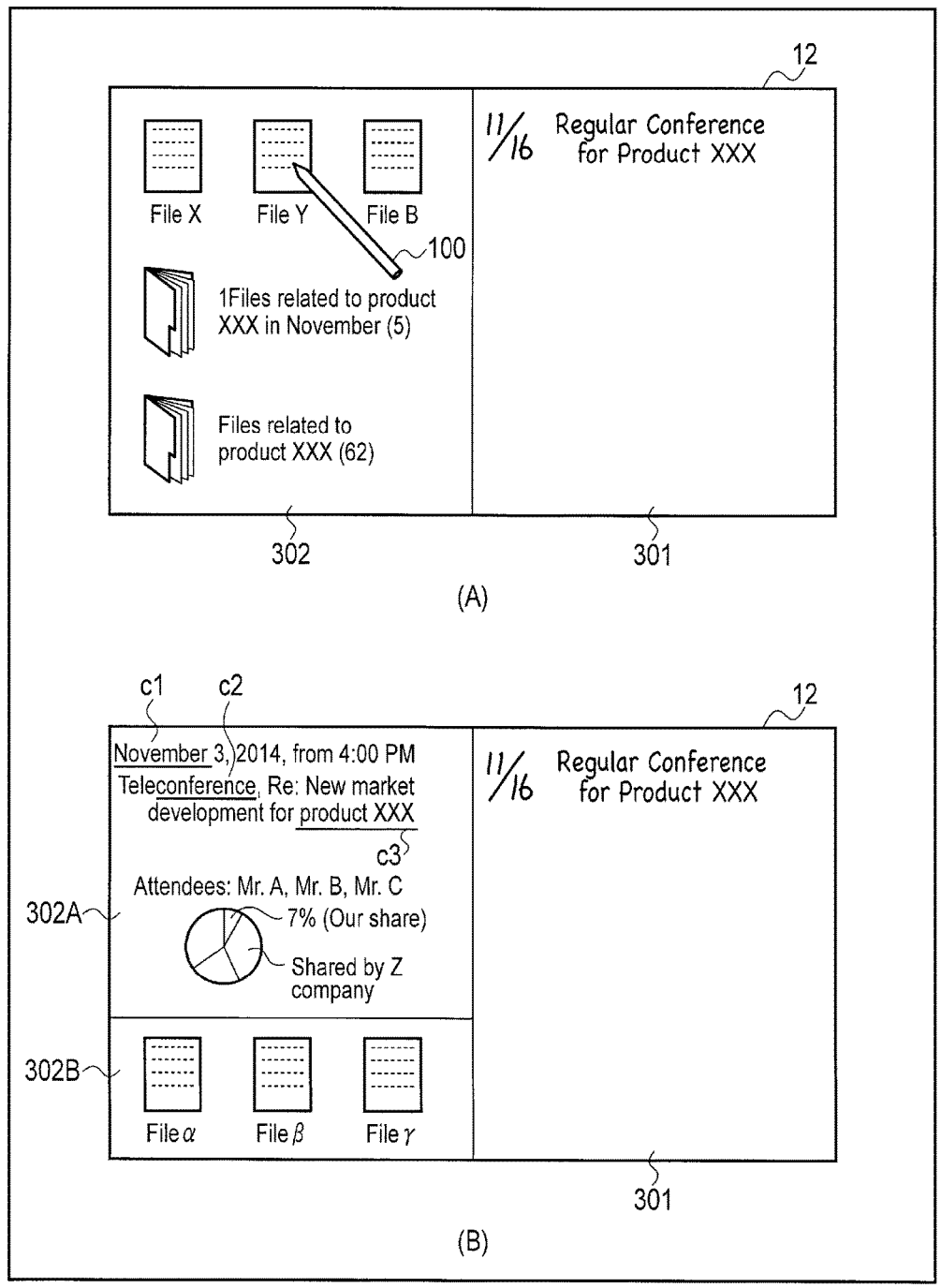
FIG. 5 is an exemplary second illustration for explaining the outline of the related data indication function of the electronic device of the embodiment.

Now, a scene that the user finishes writing the date "11/16" and the title "Regular Conference for Product XXX" in the right pane 301 and then refers to the files indicated in the left pane 302 is considered. FIG. 5 shows an example of a transition of the screen of the touchscreen display 12 when the related files are viewed. As mentioned above, in that case, the user may perform a touch operation onto an icon representing a target file. In this example, a scene that the user, to refer to file Y, performs a touch operation onto the icon representing the file Y is given as shown in FIG. 5 (A).

When the touch operation is performed, the handwritten note application program 202 sets two additional regions 302A and 302B in the left pane 302 as shown in FIG. 5 (13). Hereinafter, the region 302A is upper left pane 302A and the region 302B is lower left pane 302B.

The handwritten note application program 202 first displays content of the file requested for view by the user in the upper left pane 302A. The file Y is, for example, a document file and is retrieved and indicated as a related file since it includes data such as "November" (c1), "conference" (c2), and "product XXX" (c3) as its content.

The handwritten note application program 202 second performs retrieval of related files based on the file Y and indicates icons representing retrieved files in the lower left pane 302B. The retrieval here may acquire files preliminarily associated with the file Y as related files, or may search files based on the content and attributes of the file Y in each retrieval time. The user touches one of the icons indicated in the lower left pane 302B to display the content of the file of the icon touched. In other words, the user can update the display of the upper left pane 302A to the content of the file represented by the icon indicated in the lower left pane 302B. Then, upon the update, the handwritten note application program 202 retrieves related files based on the file represented by the icon touched and indicates icons of retrieved files in the lower left pane 302B. That is, the handwritten note application program 202 updates the display in the lower left pane 302B.

That is, the user can view not only the related files which are automatically retrieved in accordance with the progress of the handwriting input in the right pane 301 but also related files linked to the retrieved related files, which are also automatically retrieved based on the review of the retrieved related files.

Note that FIG. 5 shows an example in which the content of the related files requested by the user for view is indicated in the upper left pane 302A and the list of the related files retrieved to be linked to the related files of which content is displayed in the upper left pane 302A is displayed in the lower left pane 302B; however, no limitation is intended thereby. For example, a graphical user interface (GUI) as shown in FIG. 6 may be used. As shown in FIG. 6, content of the related file requested by the user for view is displayed to overlap with the center of the screen of the touchscreen display 12 (f1 in FIG. 6), an underlying region is provided to indicate related files linked to the requested related file in the order of priority for further retrieval (f2 in FIG. 6), and in the underlying region, content of the related files linked to the request file for further retrieval is displayed reduced in size (f3 in FIG. 6). Related files f3 displayed in the region f2 may be scrolled by a swiping touch of a finger contacting on the region f2 of the screen of the touchscreen display 12, for example. If a touch operation onto any one of the related files f3 displayed in the region f2, the content of the touched file f3 is displayed in the region f1 and related files linked to the touched related file f3 for further retrieval are newly displayed as related files f3 in the region f2 by update.

Now, a scene that a user viewing a related file performs retrieval by designating a partial region in the display region of the related file is considered. FIG. 7 shows an example of a transition of the screen of the touchscreen display 12 during the retrieval using a related file currently being viewed.

In this example, a scene that a related file displayed in the upper left pane 302A contains data "ABCDE" (d1) as shown in FIG. 7 (A) and the user now wishes to perform retrieval using the data "ABCDE" (d1) is given. In such a case, the user performs a touch operation to designate a partial region in which target data are displayed using the pen 100 in, for example, a similar manner to drawing a line by a marker.

Upon the touch operation, the handwritten note application program 202 performs layout analysis of the related file displayed in the upper left pane 302A, and designates the data corresponding to the designated partial region. As mentioned above, the tablet computer 1 of the present embodiment may store a result of image recognition as a text, and thus, data in an image can be used for retrieval. Furthermore, if data corresponding to the designated partial region are determined to be an image by the layout analysis, an image recognition process may be performed to that partial image. In other words, the user does not need to care about data in the related file currently being displayed in the upper left pane 302A are used for the retrieval, whether text or image, or the like. The handwritten note application program 202 performs the retrieval using the designated data and indicates a result by a popup (e1), for example. If any one of the retrieved files is selected, the handwritten note application program 202 displays the content of the selected file in the upper left pane 302A (after removing popup e1) and indicates related files of the selected file in the lower left pane 302B by performing further retrieval. Thereafter, the aforementioned view of related files linked one after another can be performed.

As can be understood from the above, the user can further perform the retrieval by designating a partial region in the display region of the related file currently being viewed in the upper left pane 302A. Even when the content of the related file requested by the user for view is displayed by the GUI as in FIG. 6, a partial region can be designated for the retrieval by a touch operation on the region f1 of the screen of the touchscreen display 12 by handling the pen 100 in, for example, a similar manner to draw a line by a marker.

FIG. 8 is an exemplary block diagram showing the related data indication function of the handwritten note application program 202.

As shown in FIG. 8, the handwritten note application program 202 includes a receiver 401, context determination module 402, query converter 403, related data retriever 404, and related data indicator 405.

The receiver 401 inputs an event detected by the touchscreen display 12. The touchscreen display 12 is configured to detect events such as touch, slide, and release. Touch is an event indicative of a touch of an external object (pen 100 or a finger) on the screen. Slide is an event indicative of a movement of the external object on the screen. Release is an event indicative of detachment of the external object from the screen.

Based on the event input by the receiver 401, the context determination module 402 performs: (1) acquisition of stroke data corresponding to strokes handwritten in the right pane 301 shown in FIG. 4; (2) reception of a selection instruction of a related file indicated in the left pane 302 or in the lower left pane 302B shown in FIG. 5; and (3) reception of a designation instruction of a partial region in (a display region of a related file) in the upper left pane 302A shown in FIG. 6. Upon receipt of, for example, stroke data, the context determination module 402 supplies character codes corresponding to the received stroke data to the query converter 403. Upon receipt of, for example, a selection instruction of a related file, the context determination portion 402 supplies attribution data of the related file to the query converter 403. Furthermore, upon receipt of, for example, a designation instruction of a partial region in a display region of a related file, the context determination module 402 supplies character codes corresponding to the partial region to the query converter 403. The context determination module 402 includes a layout analysis module 402A configured to execute the layout analysis of the related file which is necessary to acquire the character codes corresponding to the designated partial region. The layout analysis module 402A may have an image recognition function.

The query converter 403 uses the data supplied from the context determination module 402 and creates a retrieval request statement (query) for retrieval of related data. If the character codes corresponding to the stroke data are supplied from the context determination module 402, the query converter 403 updates the query created previously (query created using character codes corresponding to stroke data) based on the character codes supplied. Note that the character codes corresponding to the stroke data are stored in a region in, for example, the main memory 103 assigned to the handwritten note application program 202, and the query converter 403 may recreate the query using the stored character codes together. The query converter 403 supplies the created query to the related data retriever 404.

The related data retriever 404 performs the retrieval using the query created by the query converter 403. An integrated management data base (DB) 500 shown in FIG. 8 is a data base established in a storage medium (nonvolatile memory 106) in the tablet computer 1, or in a storage medium in the server system 2, or in a logical integration of these storage media. The integrated management DB 500 stores various information items such as handwriting 501, images 502, sounds 503, and texts 504. Handwriting 501 is time series data indicative of a series of coordinates of a locus of each stroke and an order relationship between the strokes, that is, handwritten documents. The related data retriever 404 retrieves data matching the query from these data stored in the integrated management DB 500. The related data indicator 405 indicates the data retrieved by the related data retriever 404 in the left pane 302 shown in FIG. 4 or in the lower left pane 302B shown in FIG. 5, or in a popup shown in FIG. 7.

Figure 9:
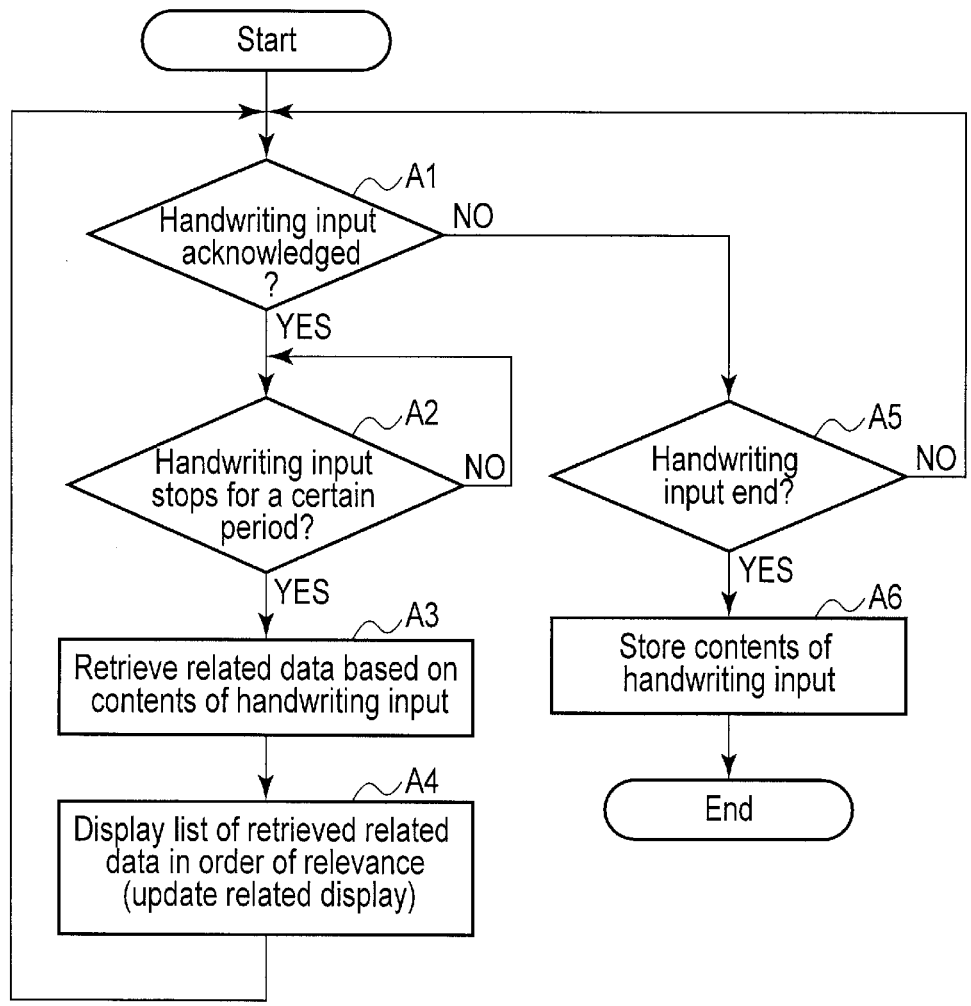
FIG. 9 is an exemplary flowchart showing a first operation of the related data indication function of the electronic device of the embodiment.

FIG. 9 is an exemplary flowchart showing a first operation (operation in accordance with a handwriting input in the right pane 301) of the related data indication function of the tablet computer 1.

If a handwriting input is performed in the right pane 301 (YES in block A1), the tablet computer 1 performs, at the time when, for example, the handwriting input stops for a certain period (YES in block A2), the retrieval of related data (block A3). The tablet computer 1 indicates the retrieved related data in the order of relevance in the left pane 302 (block A4). More specifically, the tablet computer 1 updates targets to be indicated in the left pane 302.

Furthermore, the tablet computer 1 stores, at the time when the handwritten document is finished in the right pane 301 (NO in block A1, YES in block A5), the content handwritten until then, that is, the handwritten document in the storage medium (block A6).

Furthermore, FIG. 10 is an exemplary flowchart showing a second operation (operation in accordance with a selection operation in the left pane 302 or in the lower left pane 302B) of the related data indication function of the tablet computer 1.

If related data are selected in the left pane 302 or in the lower left pane 302B (YES in block B1), the tablet computer 1 first displays the content of the selected related data in the upper left pane 302A (block B2). The tablet computer 1 second performs further retrieval of related data based on, for example, attribution data of the selected related data (block B3), and indicates the retrieved related data in the order of relevance in the lower left pane 302B (block B4).

FIG. 11 is an exemplary flowchart showing a third operation (operation in accordance with a designation operation in the upper left pane 302A) of the related data indication function of the tablet computer 1.

If a partial region is designated in the upper left pane 302A (in which content of related data is displayed) (YES in block c1), the tablet computer 1 performs layout analysis and performs data retrieval using the data corresponding to the designated partial region as a retrieval key (block C2). The tablet computer 1 displays the retrieved data using, for example, a popup (block C3).

As can be understood from the above, the tablet computer 1 of the present embodiment can retrieve and indicate files related to a handwritten document currently being created by using the handwritten document itself as a retrieval keyword while the user is not bothered by related file retrieval operations such as checking files scattered in a plurality of hierarchical layers retrospectively and repeating retrievals of files changing retrieval conditions such as keywords and the like.

Furthermore, the tablet computer 1 of the present embodiment achieves serial view of related files. Furthermore, the tablet computer 1 achieves retrieval performed by designating a partial region in a display region in a related file currently being viewed.

That is, the tablet computer 1 of the present embodiment efficiently supports a handwritten document creation work by a user.

Note that, in the examples above, retrieval and indication of related data are performed automatically and adaptively in accordance with a handwriting input on the screen of the touchscreen display 12; however, no limitation is intended thereby. The retrieval and indication of related data may be performed automatically and adaptively in accordance with input of sound data via the microphone 14, for example. That is, data related to remarks made by attendees at a conference can be automatically and adaptively retrieved and indicated, for example. Furthermore, the retrieval and indication of related data may be performed automatically and adaptively in accordance with input of image data via the camera 13, for example. That is, data related to writings on a whiteboard in a conference (which are taken by the camera 13) can be automatically and adaptively retrieved and indicated, for example.

The functions described in the embodiment may be achieved by a process circuit. The process circuit may be, for example, a programmed processor such as a central processor (CPU). The processor executes a program stored in a memory to perform the described functions. The processor may be a microprocessor including an electric circuit. The process circuit may be, for example, digital signal processor (DSP), application specific integrated circuit (ASIC), microcontroller, controller, and other electric circuit components.

Since each process in the embodiment can be achieved by a computer program, the advantage of the embodiment can be easily achieved by a computer by installing such a computer program via a computer-readable storage medium into the computer and executing the program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a touchscreen display; and
a processor configured to execute at least application program comprising an edit function of time series data, a retrieval function based on a trace of handwriting, a character recognition function, and a related data indication function,
wherein
the processor is configured to:
acquire stroke data corresponding to strokes handwritten on a screen of the touchscreen display;
acquire a character code which is a result of character recognition of the stroke data;
execute a first retrieval and a second retrieval by using the character code as a keyword for an external file or an internal file, the first retrieval retrieving files containing the keyword as part of content, the second retrieval retrieving files containing a part or whole of keyword as their attribution; and
display one or more first files and one or more second files on the touchscreen display while updating the one or more files and the one or more second files to be displayed, the one or more first files being retrieved by the first retrieval along with a progress of a handwritten operation, the one or more second files being retrieved by the second retrieval along with the progress of the handwritten operation.

2. The electronic device of claim 1, wherein:
the processor is configured to:
acquire the one or more first files and the one or more second files associated with the stroke data corresponding to the handwriting strokes in a first region on the touchscreen display; and
display the one or more first files and the one or more second files in a second region on the touchscreen display.

3. The electronic device of claim 2, wherein an icon representing a folder storing the one or more first files and the one or more second files is displayed in the second region.

4. The electronic device of claim 2, wherein the processor is configured to display a list of the one or more first files and the one or more second files using objects each of which is unique, and to display a content of one of the one or more first files and the one or more second files in the second region when a corresponding object is selected from the objects.

5. The electronic device of claim 4, wherein:
the processor is configured to:
execute, when one of the objects is selected and viewed, a third retrieval retrieving files associated with a viewed object;
acquire one or more third files associated with the viewed object by the third retrieval; and
display the one or more third files in the second region.

6. The electronic device of claim 4, wherein the processor is configured to:
execute, when a partial region is designated in the display region in which a content of related data corresponding to the selected object is displayed, a fourth retrieval retrieving files associated with the partial region;
acquire one or more fourth files associated with the partial region by the fourth retrieval; and
display the one or more fourth files in the second region.

7. A method for an electronic device comprising a touchscreen display, and a processor configured to execute at least application program comprising an edit function of time series data, a retrieval function based on a trace of handwriting, a character recognition function, and a related data indication function, the method comprising:
acquiring stroke data corresponding to strokes handwritten on a screen of the touchscreen display;
acquiring a character code which is a result of character recognition of the stroke data;
executing a first retrieval and a second retrieval by using the character code as a keyword for an external file or an internal file, the first retrieval retrieving files containing the keyword as part of content, the second retrieval retrieving files containing a part or whole of keyword as their attribution; and
displaying one or more first files and one or more second files on the touchscreen display while updating the one or more files and the one or more second files to be displayed, the one or more first files being retrieved by the first retrieval along with a progress of a handwritten operation, the one or more second files being retrieved by the second retrieval along with the progress of the handwritten operation.

8. The method of claim 7, further comprising:
acquiring the one or more first files and the one or more second files associated with the stroke data corresponding to the handwriting strokes in a first region on the touchscreen display; and displaying the one or more first files and the one or more second files in a second region on the touchscreen display.

9. The method of claim 8, wherein an icon representing a folder storing the one or more first files and the one or more second files is displayed in the second region.

10. The method of claim 8, further comprising displaying a list of the one or more first files and the one or more second files using objects each of which is unique, and displaying a content of one of the one or more first files and the one or more second files in the second region when a corresponding object is selected from the objects.

11. The method of claim 10, further comprising:
executing, when one of the objects is selected and viewed, a third retrieval retrieving files associated with a viewed object;
acquiring one or more third files associated with the viewed object by the third retrieval; and
displaying the one or more third files in the second region.

12. The method of claim 10, further comprising:
executing, when a partial region is designated in a display region in which a content of related data corresponding to the selected object is displayed, a fourth retrieval retrieving files associated with the partial region;
acquiring one or more fourth files associated with the partial region by the fourth retrieval; and
displaying the one or more fourth files in the second region.

13. A non-transitory computer-readable storage medium having stored thereon a computer program which is executable by a computer, the computer program being for executing at least application program comprising an edit function of time series data, a retrieval function based on a trace of handwriting, a character recognition function, and a related data indication function, the computer program controlling the computer to execute functions of:
acquiring stroke data corresponding to strokes handwritten on a screen of the touchscreen display;
acquiring a character code which is a result of character recognition of the stroke data;
executing a first retrieval and a second retrieval by using the character code as a keyword for an external file or an internal file, the first retrieval retrieving files containing the keyword as part of content, the second retrieval retrieving files containing a part or whole of keyword as their attribution; and displaying one or more first files and one or more second files on the touchscreen display while updating the one or more files and the one or more second files to be displayed, the one or more first files being retrieved by the first retrieval along with a progress of a handwritten operation, the one or more second files being retrieved by the second retrieval along with the progress of the handwritten operation.

14. The medium of claim 13, the computer program further controlling the computer to execute functions of:
acquiring the one or more first files and the one or more second files associated with the stroke data corresponding to the handwriting strokes in a first region on the touchscreen display; and
displaying the one or more first files and the one or more second files in a second region on the touchscreen display.

15. The medium of claim 14, wherein an icon representing a folder storing the one or more first files and the one or more second files is displayed in the second region.

16. The medium of claim 14, the computer program further controlling the computer to execute function of displaying a list of the one or more first files and the one or more second files using objects each of which is unique, and displaying a content of one of the one or more first files and the one or more second files in the second region when a corresponding object is selected from the objects.

17. The medium of claim 16, the computer program further controlling the computer to execute functions of:
executing, when one of the objects is selected and viewed, a third retrieval retrieving files associated with a viewed object;
acquiring one or more third files associated with the viewed object by the third retrieval; and
displaying the one or more third files in the second region.

18. The medium of claim 16, the computer program further controlling the computer to execute functions of:
executing, when a partial region is designated in a display region in which a content of related data corresponding to the selected object is displayed, a fourth retrieval retrieving files associated with the partial region;
acquiring one or more fourth files associated with the partial region by the fourth retrieval; and
displaying the one or more fourth files in the second region.

* * * * *